US007644022B2

(12) United States Patent
Kavanaugh

(10) Patent No.: US 7,644,022 B2
(45) Date of Patent: Jan. 5, 2010

(54) SYSTEM FOR FUNDING, ANALYZING AND MANAGING LIFE INSURANCE POLICIES FUNDED WITH ANNUITIES

(76) Inventor: Bart Kavanaugh, 2250 E. Imperial Hwy., Suite 200, El Segundo, CA (US) 90245-3508

( * ) Notice: Subject to any disclaimer, the term of this patent is extended or adjusted under 35 U.S.C. 154(b) by 719 days.

(21) Appl. No.: 11/154,572

(22) Filed: Jun. 17, 2005

(65) Prior Publication Data
US 2005/0234747 A1 Oct. 20, 2005

Related U.S. Application Data

(63) Continuation of application No. 09/986,670, filed on Nov. 9, 2001, now Pat. No. 6,950,805.

(60) Provisional application No. 60/246,755, filed on Nov. 9, 2000, provisional application No. 60/286,344, filed on Apr. 26, 2001.

(51) Int. Cl.
*G06Q 40/00* (2006.01)
(52) U.S. Cl. .............................. 705/35; 705/36; 705/39
(58) Field of Classification Search .................. 705/35, 705/36, 39
See application file for complete search history.

(56) References Cited

U.S. PATENT DOCUMENTS

| 5,136,502 | A |  | 8/1992 | Van Remortel et al. |
| 5,590,037 | A |  | 12/1996 | Ryan et al. |
| 5,631,828 | A |  | 5/1997 | Hagan |
| 5,673,402 | A |  | 9/1997 | Ryan et al. |
| 5,752,236 | A |  | 5/1998 | Sexton et al. |
| 5,819,230 | A |  | 10/1998 | Christie et al. |
| 5,864,685 | A |  | 1/1999 | Hagan |
| 5,893,071 | A |  | 4/1999 | Cooperstein |
| 5,907,828 | A |  | 5/1999 | Meyer et al. |
| 5,911,135 | A |  | 6/1999 | Atkins |
| 5,913,198 | A | * | 6/1999 | Banks ........................ 705/36 R |
| 5,966,693 | A |  | 10/1999 | Burgess |
| 5,991,744 | A |  | 11/1999 | DiCresce |
| 6,049,772 | A |  | 4/2000 | Payne et al. |
| 6,064,969 | A |  | 5/2000 | Haskins |

(Continued)

FOREIGN PATENT DOCUMENTS

WO    WO 95/23379    8/1995

OTHER PUBLICATIONS

White, G. "Banks Should Encourage Customers to Use Direct Deposit". The American Banker, Mar. 26, 1981, p. 4. The American Banker, Inc. [retrieved on Mar. 29, 2002]. Retrieved from: Lexis-Nexis[online].

(Continued)

*Primary Examiner*—Jagdish N Patel
(74) *Attorney, Agent, or Firm*—Dickstein Shapiro LLP

(57) ABSTRACT

The invention relates to a program that administers a method of funding life insurance policies using annuities that are purchased at least in part using borrowed money, using business and trust structures to reduce and/or eliminate tax. This investing can be done either directly by the policy or through the trust and/or other business entity. As an internal investment of the insurance policy the income generated by the annuity and the inside build-up are non-income taxable to the owner of the policy. The resulting death benefits will also be non-income taxable to the beneficiary.

12 Claims, 13 Drawing Sheets

U.S. PATENT DOCUMENTS

| | | | |
|---|---|---|---|
| 6,064,986 | A | 5/2000 | Edelman |
| 6,085,174 | A | 7/2000 | Edelman |
| 6,235,176 | B1 | 5/2001 | Schoen et al. |
| 6,275,807 | B1 | 8/2001 | Schirripa |
| 6,473,737 | B2 | 10/2002 | Burke |
| 2002/0035489 | A1 | 3/2002 | Herman et al. |

OTHER PUBLICATIONS

"Phoenix Introduces Innovative Immediate Variable Annuity". Business Wire, May 14, 2001. Business Wire Inc. [retrieved on Apr. 4, 2002]. Retrieved from: Lexis-Nexis[online].

"Deutscher Investment-Trust of the Dresdner Bank Group Rely on Softwired for Financial Asset Management Integration Solution". Java Industry Connection [online], May 29, 2001. Retrieved on Mar. 28, 2002. Retrieved from the Internet URL <http://industry.java.sun.com/javanews/stories/story2/0,1072,36827,00.html>.

"Pay Life Insurance or Long Term Care Premiums with an Immediate Annuity". GE Financial Network; www.gefin.com.

"Annuities Information" S.W.I, Incorporated; www.lowcostlifeinsurance.com.

"Die Rich and Tax Free" (Forman Publishing, Inc., Santa Monica, CA, ISBN 0-936614-15-3) by Barry Kay.

"Muni-bond alternative combines life insurance and annuities", Bruce S. Udell, National Underwriter, Cincinnati, Jul. 12, 1999.

"Paired for Life", Gordon Giacomin, CA Magazine, Toronto, Nov. 1999.

Life Insurance Trusts: A Way to Save Estate Taxes, Exert Control, the College for Financial Planning, May 2000.

"Banks Should Encourage Customers to Use Direct Deposit", George C. White, Jr., The American Banker, Mar. 26, 1981.

"Phoenix Introduces Innovative Immediate Variable Annuity", Business Wire, Inc., May 14, 2001.

"Pay Life Insurance or Long Term Care Premiums with an immediate Annuity." GE Financial Network, Jan. 21, 2001.

* cited by examiner

FIG. 1

Annuity Funded Life Insurance Cash Flow Analysis

| Loan Analysis | |
|---|---|
| Interest Rate: | LIBOR +2% | 6.7500% |
| Insurance | | |
| Mass Mutual | | $425,304 |
| Phoenix Life | | $362,914 |
| Annuity Deposit | 106 | $12,793,431 |
| Total Loan | | $13,581,649 |

| Insurance Policy Information | |
|---|---|
| (Insurance Illustrations are Included) | |
| Mass Mutual | $10,000,000 |
| Phoenix Life | $8,000,000 |
| Total Coverage: | $18,000,000 | 108 |

| Annuity Taxation Details | |
|---|---|
| Exclusion Ratio | 63.5% |
| Tax Bracket | 40% |

| Year | Age | Annuity Payout | Interest Paid | Ins Premium | Insurance Face | At Death Net To Lender | Net Insurance | Basis Balance | Amount Taxable | Annuity Tax |
|---|---|---|---|---|---|---|---|---|---|---|
| 1 | 73 | – | – | (788,218) | 18,000,000 | (13,581,649) | 4,418,351 | 12,793,431 | | 270,828 |
| 2 | 74 | 1,854,987 | (970,262) | (624,430) | 18,000,000 | (14,281,261) | 3,718,739 | 11,615,515 | 677,070 | 270,828 |
| 3 | 75 | 1,854,987 | (959,719) | (624,430) | 18,000,000 | (14,110,424) | 3,889,576 | 10,437,598 | 677,070 | 270,828 |
| 4 | 76 | 1,854,987 | (947,893) | (624,430) | 18,000,000 | (13,927,760) | 4,072,240 | 9,259,682 | 677,070 | 270,828 |
| 5 | 77 | 1,854,987 | (935,247) | (624,430) | 18,000,000 | (13,732,450) | 4,267,550 | 8,081,765 | 677,070 | 270,828 |
| 6 | 78 | 1,854,987 | (921,726) | (624,430) | 18,000,000 | (13,523,619) | 4,476,381 | 6,903,849 | 677,070 | 270,828 |
| 7 | 79 | 1,854,987 | (907,269) | (624,430) | 18,000,000 | (13,300,332) | 4,699,668 | 5,725,932 | 677,070 | 270,828 |
| 8 | 80 | 1,854,987 | (891,811) | (624,430) | 18,000,000 | (13,061,586) | 4,938,414 | 4,548,016 | 677,070 | 270,828 |
| 9 | 81 | 1,854,987 | (875,283) | (624,430) | 18,000,000 | (12,806,312) | 5,193,688 | 3,370,099 | 677,070 | 270,828 |
| 10 | 82 | 1,854,987 | (857,611) | (624,430) | 18,000,000 | (12,533,366) | 5,466,634 | 2,192,183 | 677,070 | 270,828 |
| 11 | 83 | 1,854,987 | (838,715) | (624,430) | 18,000,000 | (12,241,525) | 5,758,475 | 1,014,266 | 677,070 | 270,828 |
| 12 | 84 | 1,854,987 | (818,511) | (624,430) | 18,000,000 | (11,929,479) | 6,070,521 | – | 840,720 | 336,288 |
| 13 | 85 | 1,854,987 | (796,909) | (624,430) | 18,000,000 | (11,595,832) | 6,404,168 | – | 1,854,987 | 741,995 |
| 14 | 86 | 1,854,987 | (773,811) | (624,430) | 18,000,000 | (11,239,086) | 6,760,914 | – | 1,854,987 | 741,995 |
| 15 | 87 | 1,854,987 | (749,114) | (624,430) | 18,000,000 | (10,857,643) | 7,142,357 | – | 1,854,987 | 741,995 |
| 16 | 88 | 1,854,987 | (722,707) | (624,430) | 18,000,000 | (10,449,793) | 7,550,207 | – | 1,854,987 | 741,995 |
| 17 | 89 | 1,854,987 | (694,472) | (624,430) | 18,000,000 | (10,013,709) | 7,986,291 | – | 1,854,987 | 741,995 |
| 18 | 90 | 1,854,987 | (664,283) | (624,430) | 18,000,000 | (9,547,434) | 8,452,566 | – | 1,854,987 | 741,995 |
| 19 | 91 | 1,854,987 | (632,003) | (624,430) | 18,000,000 | (9,048,881) | 8,951,119 | – | 1,854,987 | 741,995 |
| 20 | 92 | 1,854,987 | (597,489) | (624,430) | 18,000,000 | (8,515,813) | 9,484,187 | – | 1,854,987 | 741,995 |
| 21 | 93 | 1,854,987 | (563,756) | (624,430) | 18,000,000 | (8,330,046) | 9,669,954 | – | 1,854,987 | 741,995 |

FIG. 2

KDI Plan™ – Cash Flow Analysis
Patent Pending

| Loan Analysis | | |
|---|---|---|
| Interest Rate# | LIBOR +2% | 6.7500% |
| Insurance | | 6.7500% |
| Mass Mutual | | $425,304 |
| Phoenix Life | | $362,914 |
| Annuity Deposit | | $12,793,431 |
| Total Loan | | $13,581,649 |

| Insurance Policy Information | |
|---|---|
| (Insurance Illustrations are Included) | |
| Mass Mutual | $10,000,000 |
| Phoenix Life | $8,000,000 |
| Total Coverage: | $18,000,000 |

| Allocation of Net Insurance | |
|---|---|
| Net to Estate | $3,718,739 |
| KDI Allocation | 2.5% |
| Net to KDI | $92,968 |

| LP = Investment | | |
|---|---|---|
| KDI Service Investment | Family Investment | |
| $200,000 | | |

| Year | Age | Annuity Cash Flow | | | | At Death Net | | |
|---|---|---|---|---|---|---|---|---|
| | | Annuity Payout | Interest Paid | Ins Premium | Service Fee | Insurance | To Lender | Net Insurance |
| 1 | 73 | 1,854,987 | (970,262) | (788,218) | (91,667) | 18,000,000 | (13,581,649) | 4,418,351 |
| 2 | 74 | 1,854,987 | (959,719) | (624,430) | (100,000) | 18,000,000 | (14,281,261) | 3,718,739 |
| 3 | 75 | 1,854,987 | (947,893) | (624,430) | (100,000) | 18,000,000 | (14,110,424) | 3,889,576 |
| 4 | 76 | 1,854,987 | (935,247) | (624,430) | (100,000) | 18,000,000 | (13,927,760) | 4,072,240 |
| 5 | 77 | 1,854,987 | (921,726) | (624,430) | (100,000) | 18,000,000 | (13,732,450) | 4,267,550 |
| 6 | 78 | 1,854,987 | (907,269) | (624,430) | (100,000) | 18,000,000 | (13,523,619) | 4,476,381 |
| 7 | 79 | 1,854,987 | (891,811) | (624,430) | (100,000) | 18,000,000 | (13,300,332) | 4,699,668 |
| 8 | 80 | 1,854,987 | (875,283) | (624,430) | (100,000) | 18,000,000 | (13,061,586) | 4,938,414 |
| 9 | 81 | 1,854,987 | (857,611) | (624,430) | (100,000) | 18,000,000 | (12,806,312) | 5,193,688 |
| 10 | 82 | 1,854,987 | (838,715) | (624,430) | (100,000) | 18,000,000 | (12,533,366) | 5,466,634 |
| 11 | 83 | 1,854,987 | (818,511) | (624,430) | (100,000) | 18,000,000 | (12,241,525) | 5,758,475 |
| 12 | 84 | 1,854,987 | (796,909) | (624,430) | (100,000) | 18,000,000 | (11,929,479) | 6,070,521 |
| 13 | 85 | 1,854,987 | (773,811) | (624,430) | (100,000) | 18,000,000 | (11,595,832) | 6,404,168 |
| 14 | 86 | 1,854,987 | (749,114) | (624,430) | (100,000) | 18,000,000 | (11,239,086) | 6,760,914 |
| 15 | 87 | 1,854,987 | (722,707) | (624,430) | (100,000) | 18,000,000 | (10,857,643) | 7,142,357 |
| 16 | 88 | 1,854,987 | (694,472) | (624,430) | (100,000) | 18,000,000 | (10,449,793) | 7,550,207 |
| 17 | 89 | 1,854,987 | (664,283) | (624,430) | (100,000) | 18,000,000 | (10,013,709) | 7,986,291 |
| 18 | 90 | 1,854,987 | (632,003) | (624,430) | (100,000) | 18,000,000 | (9,547,434) | 8,452,566 |
| 19 | 91 | 1,854,987 | (597,489) | (624,430) | (100,000) | 18,000,000 | (9,048,881) | 8,951,119 |
| 20 | 92 | 1,854,987 | (563,756) | (624,430) | (100,000) | 18,000,000 | (8,515,813) | 9,484,187 |
| 21 | 93 | 1,854,987 | (563,756) | (624,430) | (100,000) | 18,000,000 | (8,330,046) | 9,669,954 |

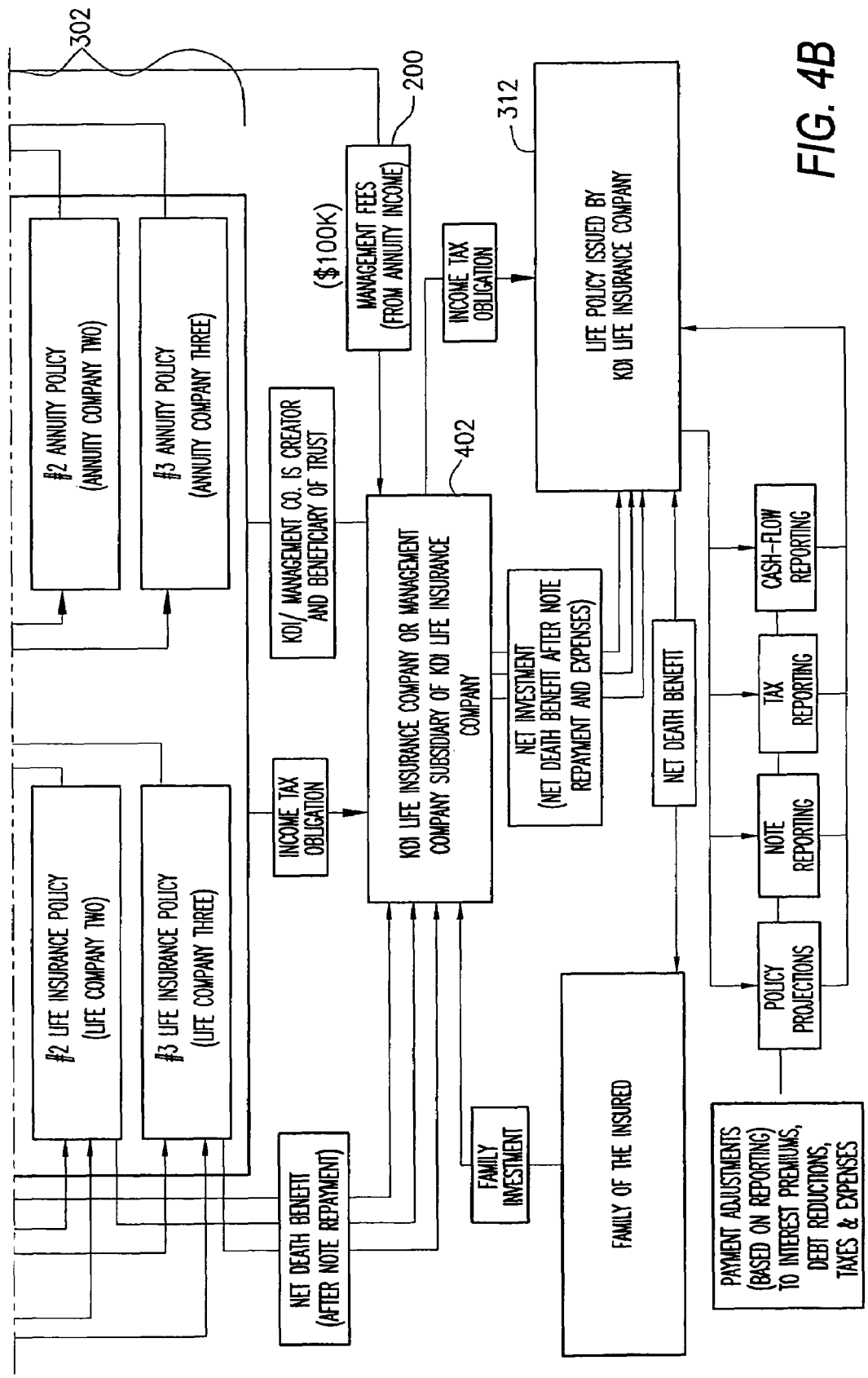

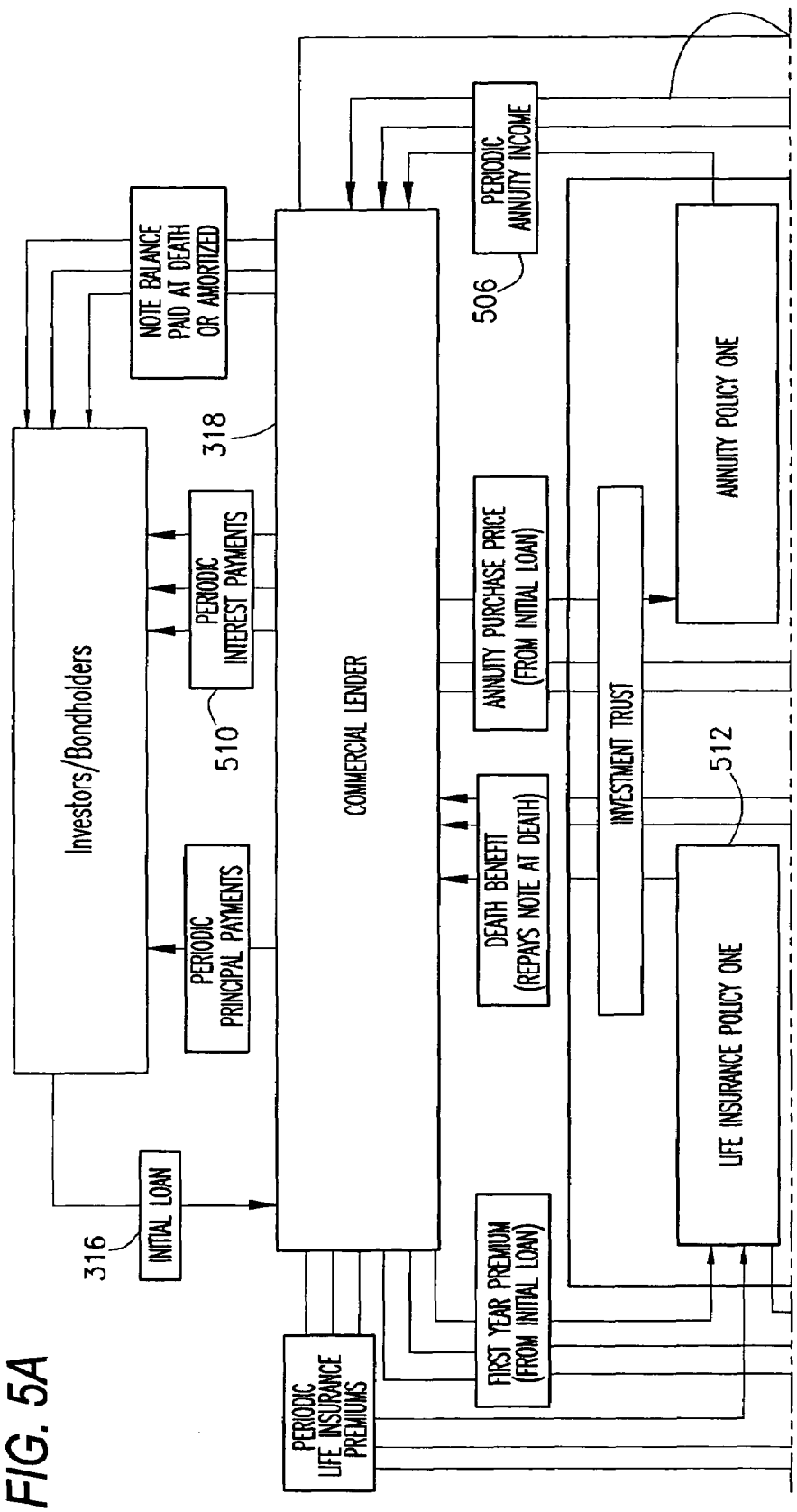

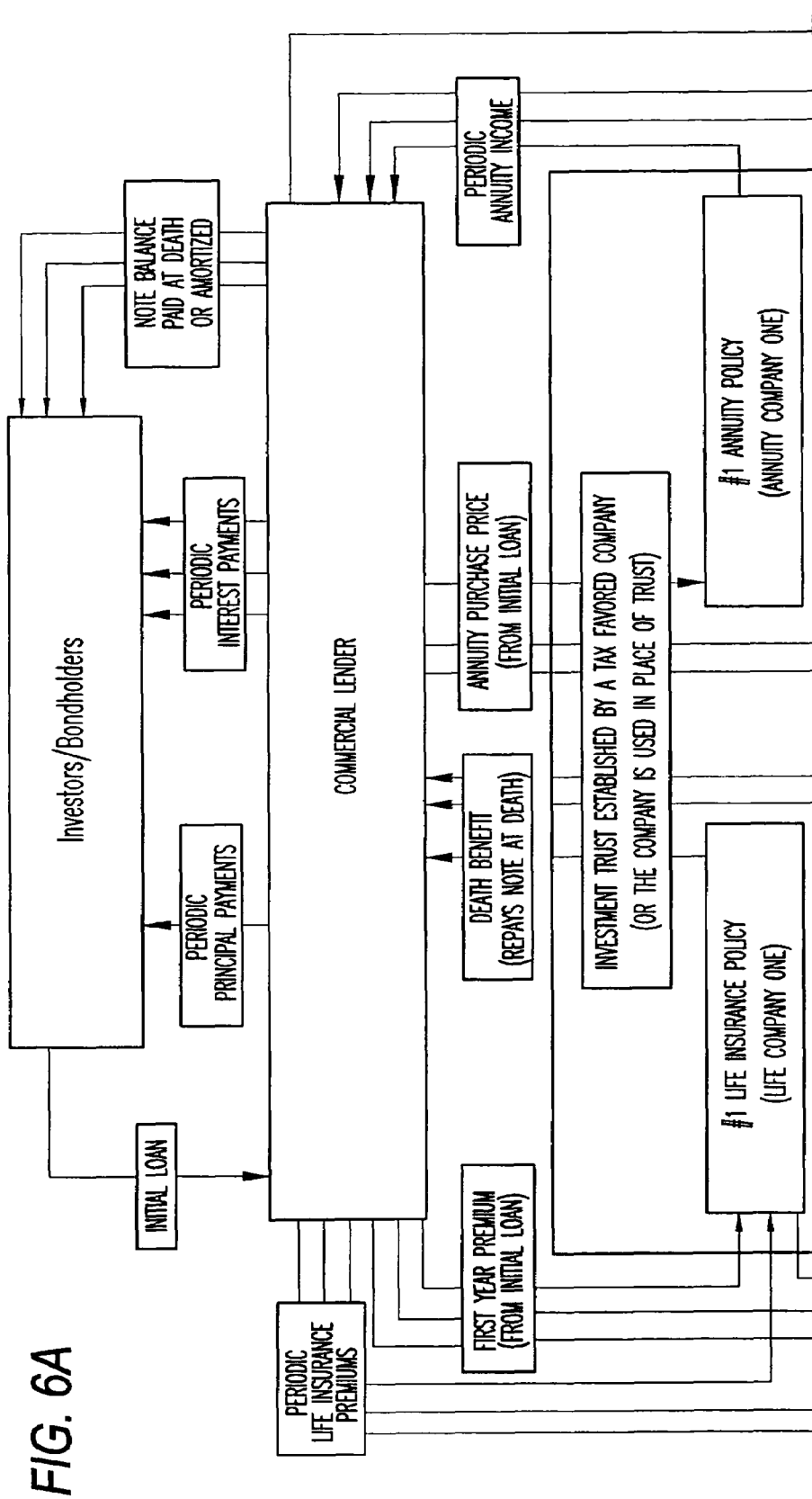

SYSTEM FOR FUNDING, ANALYZING AND MANAGING LIFE INSURANCE POLICIES FUNDED WITH ANNUITIES

CROSS-REFERENCE TO RELATED APPLICATIONS

This application claims priority to provisional applications 60/246,755 filed Nov. 9, 2000 and 60/286,344, filed Apr. 26, 2001, and is a continuation of Application No. 09/986,670, filed Nov. 9, 2001, now U.S. Pat. No. 6,950,805 and incorporates the contents of those applications by reference.

FIELD OF THE INVENTION

The present invention relates to a method and apparatus for administering life insurance policies using annuities for funding, while realizing substantial tax advantages.

BACKGROUND OF THE INVENTION

In the past, private individuals and businesses currently use annuities as funding sources for insurance policies. However, the income tax ramifications as well as the lack of a system to administer such transactions on a large scale significantly limit the market for such purchases.

Individuals and charities or otherwise tax-exempt organizations have been approached with a number of systems over the years that employ the use of insurance products. There are three primary reasons that most of these systems have been unsuccessful.

First, the U.S. Internal Revenue Service has attacked many systems involving life insurance products. Tax-exempt organizations in particular must be careful not to engage in any activities that may endanger their tax-exempt status. Second, individuals and tax-exempt organizations will not generally use their existing resources to fund directly or to be used as a guarantee for the funding of such arrangements. This is because these arrangements generally do not meet their criteria for investing. Third, simplified tools necessary to administer these very complex strategies are generally not available.

There are two types of annuities relevant to this specification, deferred and immediate. Deferred annuities differ from immediate annuities in the following way. Deferred annuities "defer" payments to the investor and immediate annuities have payments to the investor that start "immediately". Annuities were originally designed as immediate annuities because customers desired income for as long as they lived. However, as customers' interests evolved, holders of annuities desired to start their income stream at some point in the future rather than immediately, perhaps after the death of a spouse. Consequently, they put money in an annuity at present, let an insurance company invest it, and at some point in the future convert the annuity from a deferred compensation plan to an immediate compensation model. That's how the name "deferred annuity" arose because the first payment to the investor is deferred to some point in the future.

Presently, the majority of annuities that are sold are deferred annuities. The primary reason for their current popularity is that the earnings accumulate on a tax deferred basis. Thus, many customers use them strictly as a tax efficient investment vehicle. However, annuity contracts always have the right to convert it in some cases must convert at a certain age to an immediate annuity, primarily for tax reasons. Specifically, customers use annuities to defer their income tax. An immediate annuity yields an immediate income stream. Immediate is defined by the IRS as an annuity where the first payment starts within one year, i.e. within one year of the first annuity investment.

If the first payment is deferred for more than one year, it's not treated as an immediate annuity for tax reasons. It becomes similar to a deferred annuity. Most importantly, the taxation of payments, and the character of the taxation changes, with a corresponding change in the tax consequences.

Furthermore, an immediate annuity income stream can be based on life expectancy. An 81 year old has a shorter life expectancy than an 80 year old, thus enhancing the pay out, which is based on life expectancy as determined from actuarial tables. Suppose a customer gives an insurance company $100 (setting aside interest and profit). Suppose also the person had a life expectancy of ten years. The insurance company then states agrees to give that person $10 a year for the rest of their life.

Such an arrangement is, for tax purposes, characterized as a return of principal and not as taxable earnings. In an actual immediate annuity arrangement with a commercial life insurance company, the insurance company also adds interest and this interest is taxable. Also, once the principal amount has been fully returned, the entire annuity payout is taxable. Since the return of principal is completed at life expectancy, all income from the annuity after life expectancy is fully taxable. This constitutes a major increase in the tax obligation for those individuals that live past their life expectancy.

The reason the insurance company can guarantee a life income is the law of large numbers. Actuaries can tell statistically how many people are going to die before their life expectancy, and annuity companies get to keep the balance of the money. For the people that die after their life expectancy, they use the money that was saved from the early-deceased people to pay them.

Consider a person who has a five-year life expectancy. When they give the insurance company $100, the insurance company will agree to give them $20 a year for life, which looks like a 20% return guaranteed on an investment. Few other kinds of financial instruments can get a guaranteed for life 20% return on an investment, especially from an AAA rated company. Thus, the rate of return drives the concept of annuities. Another benefit is that if the purchaser lives beyond the life expectancy they win, because they get more money than what they paid. Their estate also wins if they take that income stream and peel off part of it and buy a $100 life insurance policy. This is because if they die in the first year their estate will get their $100 back from the life insurance policy.

The life expectancy of a 30 year old is much longer than an 80 year old; therefore their annuity income stream will be much smaller. Thus, the strategy described earlier would not be practical for a 30 year old because the payout of the annuity would be so low. However, an 80-year-old client can borrow money and get a high enough pay out. A qualified 80-year-old can borrow the $100 and get a high enough pay out from the annuity to pay interest on the loan, and pay the premium on a $120 life insurance policy. When he dies the lender would receive the $100 back. The $20 that's left over goes to his family.

Consequently, the lender receives money in two ways. The first is taking interest payments from the income stream paid by the immediate annuity. Second, a major life insurance company guarantees that the remaining principal will be repaid at death. The basic premise of using an annuity income stream to buy life insurance has been in the public domain for many years.

SUMMARY OF THE INVENTION

In view of the foregoing, there exists a need in the art for a system which combines annuities and life insurance in a way that is advantageous for tax purposes. One aspect of the present invention provides a system for combining life insurance and annuities, including borrowing money from a lender, purchasing an annuity and a life insurance policy using the borrowed money, paying premiums for the life insurance policy using income from the annuities, making periodic payments on the borrowed money using income from the annuities, and managing tax consequences of the income within an investment trust. In another aspect of the invention, the investment trust includes a partnership connected to a tax favored entity. In yet another aspect of the invention, the members of the partnership are paid by dividends.

In yet another aspect of the invention, the annuities are purchased from a purchaser's existing assets, and no loan is necessary. In yet another aspect of the invention, the beneficiaries of the life insurance policy or policies are charitable institutions.

BRIEF DESCRIPTION OF THE DRAWINGS

The foregoing and other features and advantages of the invention will become more apparent from the detailed description of the exemplary embodiments of the invention given below with reference to the accompanying drawings.

FIG. 1 shows one possible result of combining annuities and life insurance.

FIG. 2 shows an improvement in the results of FIG. 1 using the techniques of the present invention.

DETAILED DESCRIPTION OF THE PREFERRED EMBODIMENTS

Figure 3:
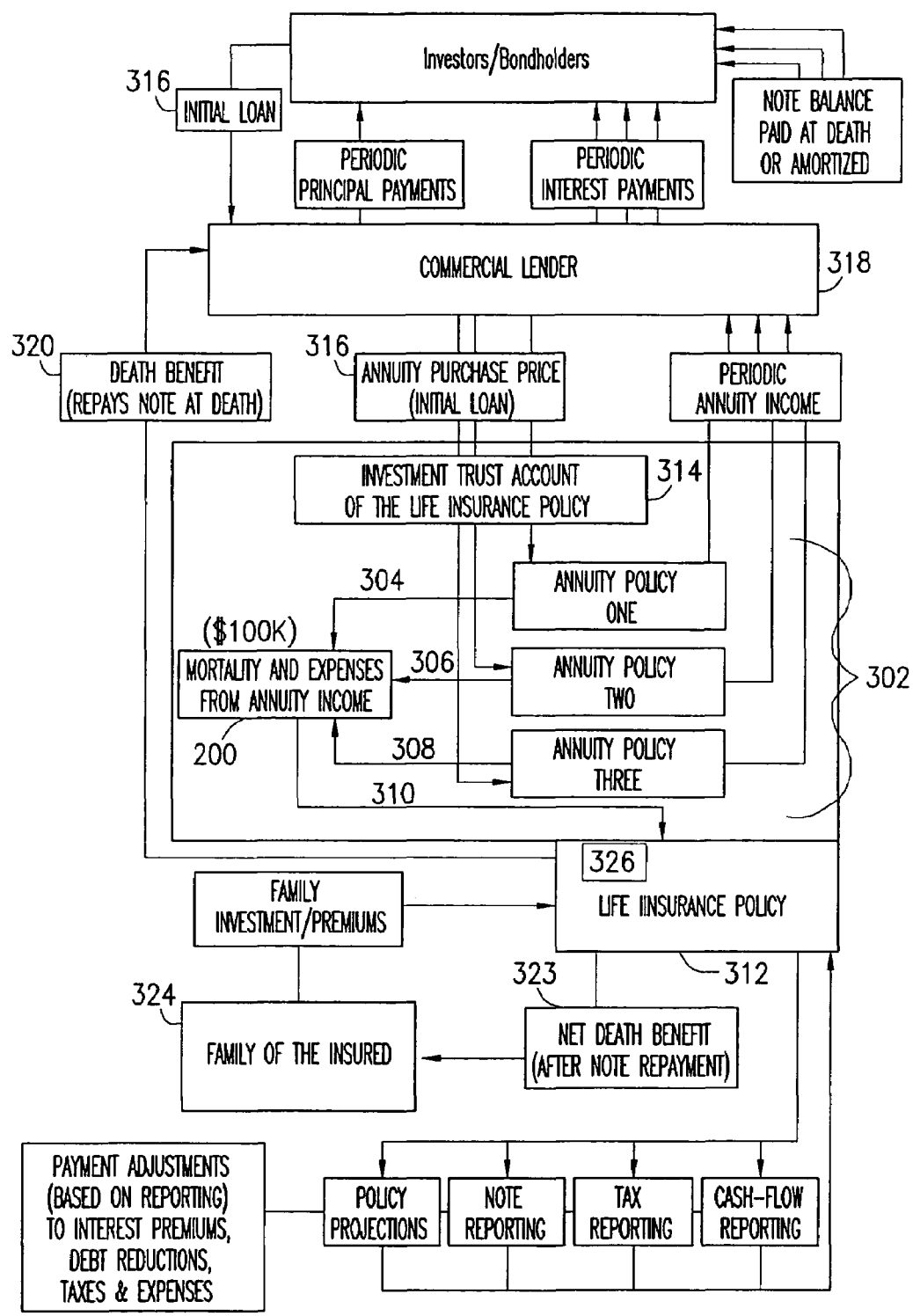
FIG. 3 shows a flowchart of the first embodiment of the present invention.

Borrowing money to buy life insurance has been around for a number of years. For example, American General Insurance offers a capital maximization strategy plan to its users to finance life insurance premiums and annuities. The present invention builds upon this basic concept of taking an immediate annuity contract with a life insurance company that pays a guaranteed income stream for a period of time. It does so by using what are called "life only" annuities (or annuities that have a life expectancy component), which means that for as long as one is alive they get a specified amount of money. The insurance company guarantees that money. 'Life only' annuities differ from 'period certain' annuities. Period certain annuities extend for a specified number of years. The present invention uses only "life only" immediate annuities (or variations that include a life expectancy element). Again, these do not resemble deferred annuities. Immediate annuities are simply a contract for a guaranteed income stream.

Unfortunately, income from an annuity contract that is not the return of basis is fully income taxable. This income tax is a particular problem when the annuitant on an immediate annuity contract lives past their life expectancy. Under those circumstances all of the distributions will be income taxable. The income tax ramifications on the distributions are a major impediment when considering the use of income from an annuity to purchase a life insurance policy.

If a charity or otherwise tax-exempt organization is involved in this type of transaction there is an additional concern. If any money is borrowed to fund any portion of this transaction the charity or otherwise tax-exempt organization could be subject to taxation on the income from the annuity as unrelated business income. This would force the charity to file tax returns on their activities that would not otherwise be required.

Private individuals and businesses currently use annuities as finding sources for insurance policies. However, the income tax ramifications as well as the lack of a system to administer such transactions on a large scale significantly limit the market for such purchases. Charities or otherwise tax-exempt organizations have been approached with a number of systems over the years that employ the use of insurance products.

One target of the present invention is a wealthy person who is considering the purchase of a deferred annuity or has an existing deferred annuity. Because this investment, unlike many other investments, is tax deferred (it is taxable upon distribution) many wealthy clients historically continue to defer any distribution until death. They often choose to spend investment that will be taxed before they spend tax favored investments. When they die their estate or heirs will pay state and federal income tax as well as estate tax. Instead, they could take this deferred annuity, convert it to an immediate annuity and buy life insurance with the resulting income stream. Where this arrangement can be properly structured, the tax-free death benefit would be paid to the heirs from what would have otherwise been substantially taxed.

Suppose the above wealthy individual already owns a deferred annuity generating a significant annual income stream. That individual can convert the annuity from deferred to immediate and use that income stream to buy life insurance. Suppose that individual client dies with a $1 million annuity, they are going to pay state and federal income taxes so that the net yield could go down to $500,000. After paying the estate tax in addition to the income tax, they could wind up with as little as $250,000.

Conversely, a more astute individual would convert that annuity from deferred to an immediate income stream. They'll buy a $1 million life insurance policy, the proceeds of which their children will receive tax-free. Instead of getting $250,000 after tax as described above, if they convert it and buy a life insurance with the income stream (and the arrangement is properly structured), the policy will pay $1 million after tax. Such a maneuver has well known in the industry. In fact, an insurance professional named Barry Kay has written a book on the lending of money using annuities to buy life insurance, entitled "Die Rich and Tax Free" (Forman Publishing, Inc., Santa Monica Calif., ISBN 0-936614-15-3).

However, the above maneuvers, some of which are mentioned in Barry Kay's book, do not account for all of the possible tax consequences, and the target audience for his book is a narrow spectrum of very wealthy persons. The tax consequences are of particular concern when borrowed money is used to facilitate the transaction. When borrowed money is used to buy the immediate annuity, a tax problem exists with the basic transaction. Generally when borrowed money is used to purchase insurance products, the loan interest is not tax deductible. Life insurance premiums are not tax deductible and the annuity income above basis is fully income taxable at ordinary rates. Further, when a charity is involved there is the additional concern that these transactions may be subject to tax under the unrelated business income tax rules that apply to charitable organization that engage in business activities that are not directly related to their charitable activities.

Using borrowed money to purchase an annuity to fund life insurance, however, is not conventional. As an example, a company borrows $100, and then buys a $120 life insurance policy by using part, perhaps $5, of the borrowed money to pay the first year's premium and the first year's interest. Using the remainder of the borrowed money, perhaps $95, they then buy an immediate annuity and the immediate annuity income will pay the ongoing insurance premiums as they come due (most often annually), as well as the ongoing interest and perhaps some principal on the original $100 loan. Suppose the individual has retired $20 of principal of the original $100 loan. At the death of the principal, the insurance policy would pay $120, of which $80 goes to repay the lender for the unretired portion of the loan. The $40 that's left over goes to the principal's family (supposing they are designated as beneficiaries), or a charity. In either case, that $40 would generally be tax free. This transaction would work for older insureds if there were little or no annual income taxes to be paid. However, in the majority of cases there is not sufficient income to pay the annual taxes on the annuity stream and still be able to pay the insurance premium and the interest on the loan. As a result most attempts to combine annuities with life insurance, whether using borrowed money or not, become mathematically impractical.

FIG. 1 shows a detailed example of combining annuities with life insurance using borrowed money. FIG. 1 depicts the first 21 years of a life annuity purchased by a 73 year old person with a life expectancy of 12 additional years. The 73 years can be seen from the "Age" column 102, while the life expectancy can be determined from the "Basis Balance" column 104, by noting that the $12^{th}$ year is the year at which the steadily declining Basis reaches zero. That person borrows $13,581,649 (hereinafter referred to as either a loan or a note) as shown in Total Loan amount 106, and uses the borrowed money to purchase life insurance policies having a total face value of $18 million dollars as shown by Total Coverage amount 108. As shown in column 112, each year the individual or the estate must pay an Annuity Tax for the illustrated 21 years. If the principal lives beyond their life expectancy, this tax goes up from $270,828 to $741,995. At the death of the principal, the annuity payout ceases and a net death benefit is paid to the beneficiaries.

If the person in FIG. 1 lives beyond their life expectancy, the amount of their $1,854,987 annual annuity payout which becomes taxable increases substantially (see Amount Taxable in column 110). Computing the tax on such a payout involves a factor used by the IRS known as an Exclusion Ratio, shown in FIG. 1 as being 63.5%. Using this exclusion ratio and assuming a tax bracket of 40%, the tax on the above annual payout also increases, from $336,288 to $741,995. Thus, the beneficiaries of the insured person see a substantial reduction in the net payout (Annuity Payout−Annuity Tax) every year that the insured lives beyond their life expectancy.

This is because, as stated, once the principal amount has been fully returned, the entire annuity payout is taxable. Since the return of principal is completed at life expectancy, all income from the annuity after life expectancy is fully taxable. This constitutes a major increase in the tax obligation for those individuals that live past their life expectancy.

In this way, all transactions discussed using borrowed money would usually not make economic sense because of their annuity tax implications. The present invention, however, focuses on reducing the tax implication and making it a low tax situation or in some cases a no tax situation.

Part of how these taxes are reduced is through the use of trusts. A trust is a mechanism that allows one to impose some controls over a corpus or resources that a settlor intends to give to an intended beneficiary. The settlor of a trust is the person who intentionally causes the trust to come into existence. The manager of the trust resources, also known as a trustee, has an equitable obligation to keep or use the property for the benefit of a beneficiary.

The trustee (i.e., administering institution such as KDI shown in FIG. 2) is the person or entity who holds title for the benefit of the beneficiary. The trust property is the property interest which the trustee holds subject to the rights of a beneficiary, and in the present invention would encompass all loans, annuities and life insurance policies. The trust instrument is the document by which property interests are vested in the trustee and beneficiary and the rights and duties of the parties (called the trust terms) are set forth. The trustee has a duty to retain trust documents, to keep track of expenditures necessary to run the trust, and to keep an accurate history of the trust administration. The computer system of the present invention is useful for coordinating these payment duties and maintaining accurate records, as will be discussed in more detail below.

A trustee must obey the trust instrument as to the time, amount, form and destination of payments which he is directed or authorized to make from income or principal to the beneficiaries. Thus, the trust instruments of the present invention explicitly state how the annuity stream is to be used to pay the life insurance premiums, and in the embodiments using loans, how those loans are to be repaid, all of which is information which is readily programmed into a computer system as will be discussed in more detail below. Within the present invention, trusts act to isolate the client, beneficiaries, and (where applicable) business entities from the actual financial transactions. Because of this isolation, the trust income is not taxed as personal income to the clients and beneficiaries.

Evidence of this reduction in taxes is illustrated by comparing FIG. 2 with FIG. 1. FIG. 2 assumes the same amount age, lifespan, face value, loan amount, and insurance premiums as in FIG. 1. FIGS. 1 and 2 are also the same in that both contain a Net Insurance column showing the amount that would be paid to beneficiaries upon death of the individual. However, FIG. 2 is structured using the principles of the present invention, including controlling the annuity within a trust as described above. The first and most noticeable difference is that in FIG. 2, the "Annuity Tax" column has been replaced by a "Service Fee" column 200. This is because the present invention is structured so that, although the annual Annuity Payout is still a taxable event, the tax has been either shifted, reduced, or eliminated. Accordingly, instead of paying $270,828/year (before life expectancy is reached) or $741,995/year (after life expectancy is reached), a flat fee of $100,000 is the only expense.

All four embodiments of the present invention can use borrowed money to purchase annuity contracts and pay the initial cost of life insurance. This debt is usually non-recourse, although a recourse embodiment exists where the principal guarantees at least part of the loan obligation. The cash flow from the annuity contract is employed to pay ongoing life insurance premiums, interest on the borrowed money, taxes resulting from the taxable portion of the annuity, and other transaction fees including expenses of maintaining the trust and paying the trustees. The net pay out to the beneficiary can be greatly improved by adding an immediate annuity payout to any funds contributed by the insured. The type of annuity is usually life-only, although the present invention also contemplates using a "5 year certain" annuity. The policy risk is reduced since a major institution such as a life insurance company usually guarantees the annuity payouts. However, although the above principles apply to all four embodiments of the present invention, some differences exist between them, as will now be explained.

First and Second Embodiments

The first and second embodiments have the annuity purchased by the life insurance policy as an internal investment of the policy (first embodiment), or as an investment of the life insurance company (second embodiment). As shown in FIG. 3, the first embodiment uses money that was paid to the policy 312 using money 316 borrowed by the policy 312 from a third party lender 318. As shown in FIG. 3, because of regulatory requirements requiring diversification, each life insurance policy 312 will generally have multiple annuities 302. Depending on the type of life insurance policy 312 used, the structure internal to the policy 312 may require a trust 314 or a business entity to conduct the transaction. Initially, each annuity and loan will be tracked to a particular policy 312, as indicated by the arrows 304, 306, and 308 FIG. 3. Arrow 310 depicts money flowing to the life insurance policy after deduction of the $100,000 Service Fee 200 indicated in FIG. 2, indicated by the box "Mortality and Expenses" labeled $100K.

Figures 4, 4A, 4B:
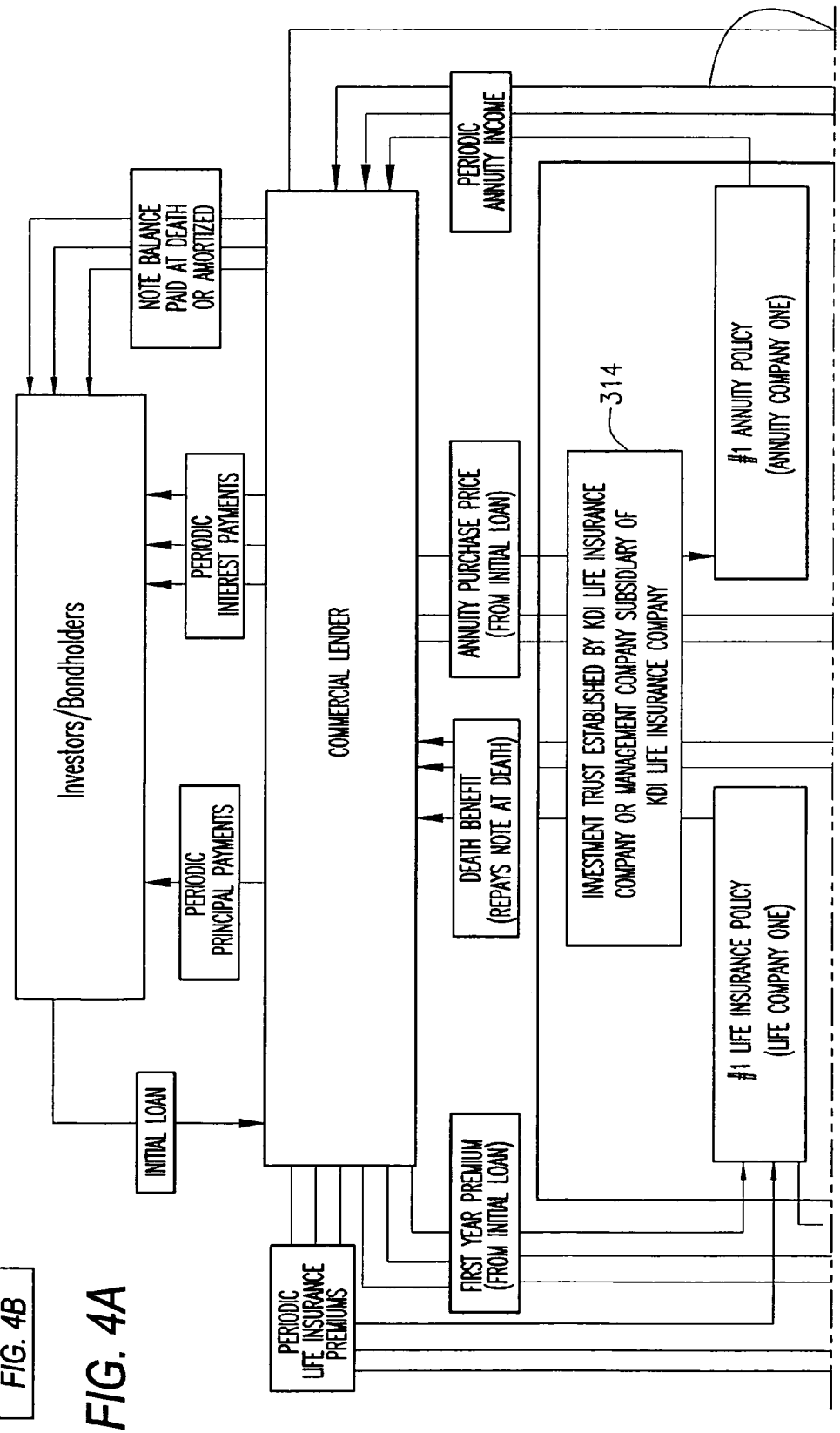
FIG. 4 shows a flowchart of the second embodiment of the present invention.

If a large enough number of insureds is accumulated, it is possible that a pool of annuities 302 and loans 316 could eliminate the need for a specific annuity being tied to a specific policy shown in FIG. 3. Such a non-tied arrangement is shown in FIG. 4.

In the first and second embodiments, the present invention greatly reduces or eliminates income taxes because the annuity portion 302 is built into the life insurance policy 312 and/or the life insurance company (second embodiment) and is going to be paid as part of the death benefit 320, as shown in FIG. 3. Insurance companies are required to invest the money placed into universal life insurance policies. The earnings on those investments are not taxable, and are called "inside build up" 326. As an internal investment of the insurance policy 312, the income generated by the annuities 302 as inside build-up is non-income taxable to the owner of the policy. The resulting death benefits 320, 323 will also be non-income taxable to the beneficiary(s) 324.

The second embodiment differs from the first in tax consequences. In the second embodiment, no inside build-up occurs, and the tax consequences are handled by an insurer 402 shown in FIG. 4 which is not present in FIG. 3. This insurer 402 also manages the investment trust 314, which unlike the first embodiment in FIG. 3, is not an account of the life insurance policy 312. Because in embodiments 2-4 the investment is not an internal component of the policy 312, the Service Fee 200 must be accounted for separately. Accordingly, the $100,000 Service Fee 200 of FIG. 2 is shown within the first embodiment in FIG. 3 as the Mortality and Expenses from Annuity Income box and is labeled '$100K'. The second embodiment (and the third and fourth) differ from the first in that the Service Fee 200 from FIG. 2 is indicated by the box "Management Fees" in FIGS. 4-6 rather than the box "Mortality and Expenses", but is also labeled $100K.

Another difference between embodiments one and two is that a pool of annuities 302 and loans 316 eliminates the need for a specific annuity being tied to a specific policy.

Third Embodiment

Figure 5B:
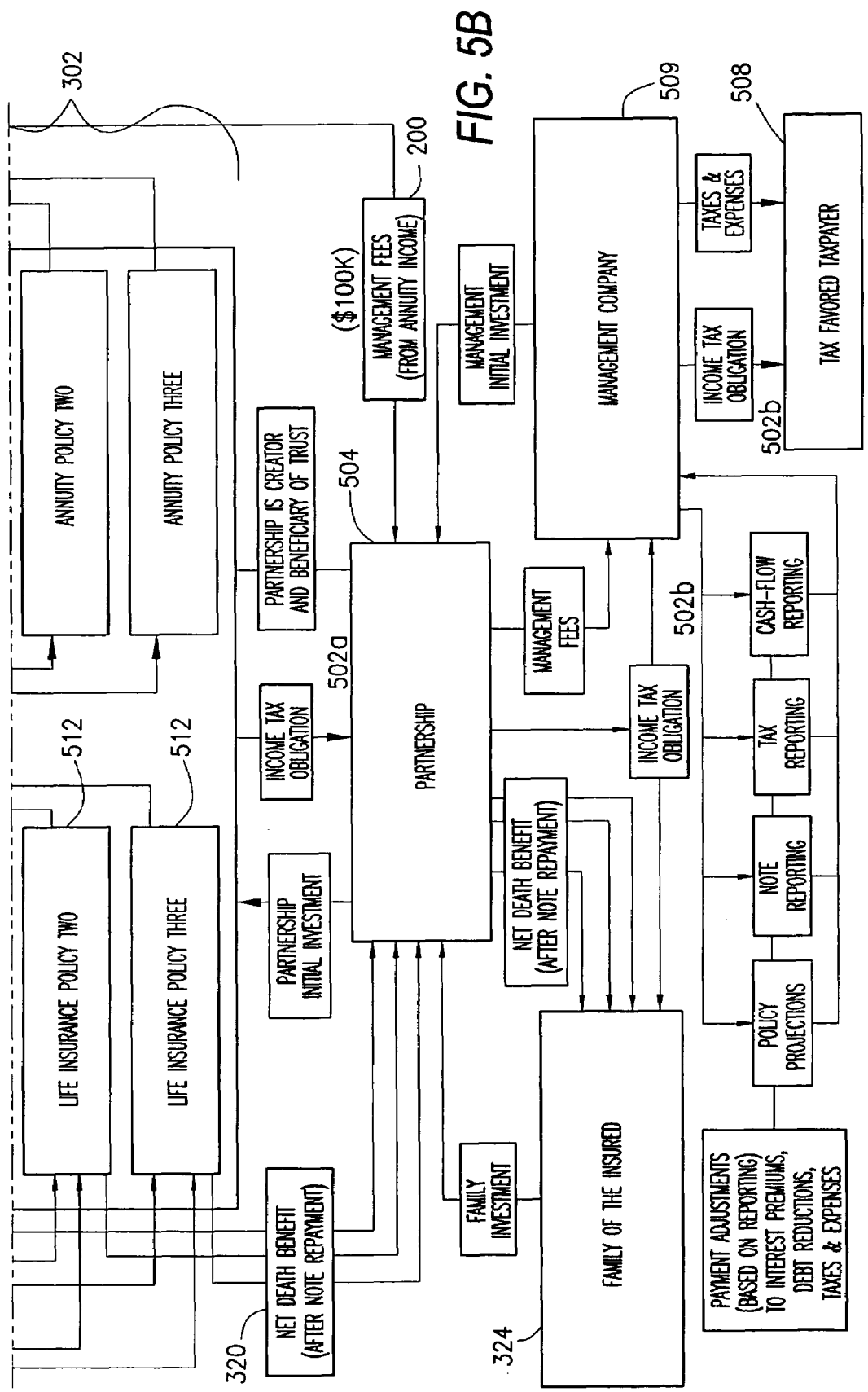
FIG. 5 shows a flowchart of the third embodiment of the present invention.

Embodiments three and four include the administration of investing in widely available insurance contracts through a unique trust, business entity and partnership arrangement. This arrangement is employed in order to closely track and direct the income tax liability 502, as shown in FIG. 5. In the third and fourth embodiments, investment growth no longer occurs inside an insurance policy, and is therefore no longer characterized as "inside build-up". Instead, owners of management company 504 that are normal business entities but have either substantial income tax credits, tax-favored status, or otherwise reduced income tax exposure, receive a significant amount of the income tax liability. This improves the cash flow available to fund the other components of the arrangement and therefore significantly widens its marketability.

Examples of tax favored entities can include businesses established within the U.S. Virgin Islands, as approved by the U.S. Congress. There are economic development zones also in the continental U.S. as well, such as around some airports. The U.S. Congress has approved for creation other types of tax favored businesses for various reasons. Thus, shifting tax consequences to a tax favored model is encouraged by the U.S. Congress.

In the structure of FIG. 5 (embodiment three), even though the partnership 504 doesn't pay taxes, the distribution 502a and 502b to its owners is fully taxable. However, as described earlier, Congress, through enterprise zones or tax-favored entities 508 allows the management company 509 to obtain tax credits to be applied toward income tax obligations 502a and 502b which arise from the annuity income stream 506. As shown in FIG. 5, embodiment three differs from embodiment two (FIG. 4) in that the tax favored entity 508 is explicitly shown as being established by a subsidiary management company 509, which was not shown in FIG. 4.

Thus, it is advantageous to attach a separate business 509 to the partnership 504. That sub-business 509 purchases annuities 302, borrows money 316 from the lender 318, pays the interest 510, and also buys life insurance policies 512. When the person dies, that partnership 504 will pay the money to that sub-business 509 and, where appropriate, pay off the note (loan) 316 as well as any negatively accrued interest. The balance is then passed down to the main partnership 504, which will then pay a death benefit to the beneficiaries (partners) 324 of that client, part of which was financed by the proceeds from the sub-company 509. The money left over becomes profit, which is distributed to the more tax-advantageous entity 508. The annual income on the annuity income stream 506 is taxable. So even though there is minimal cash flow going down to the partnership 504, there still is some partnership income (K-1). Under normal circumstances, there may be little or no money to pay the tax resulting from that partnership income. However, because the present invention uses the tax-advantageous entity 508, the tax obligation is greatly reduced. Because of this reduction, the minimal cash flow described above is sufficient to pay the tax obligation.

During the year of death of the principal, the net proceeds (which are non-taxable) are passed down to the partnership 504, which pays the amount out as a death benefit 320 to the partners/beneficiaries. Most of the red tape (from a taxation point of view) that would be associated with this death event is removed because the insurance payment is paid as a nontaxable death benefit to a beneficiary 324.

Fourth Embodiment

Figure 6B:
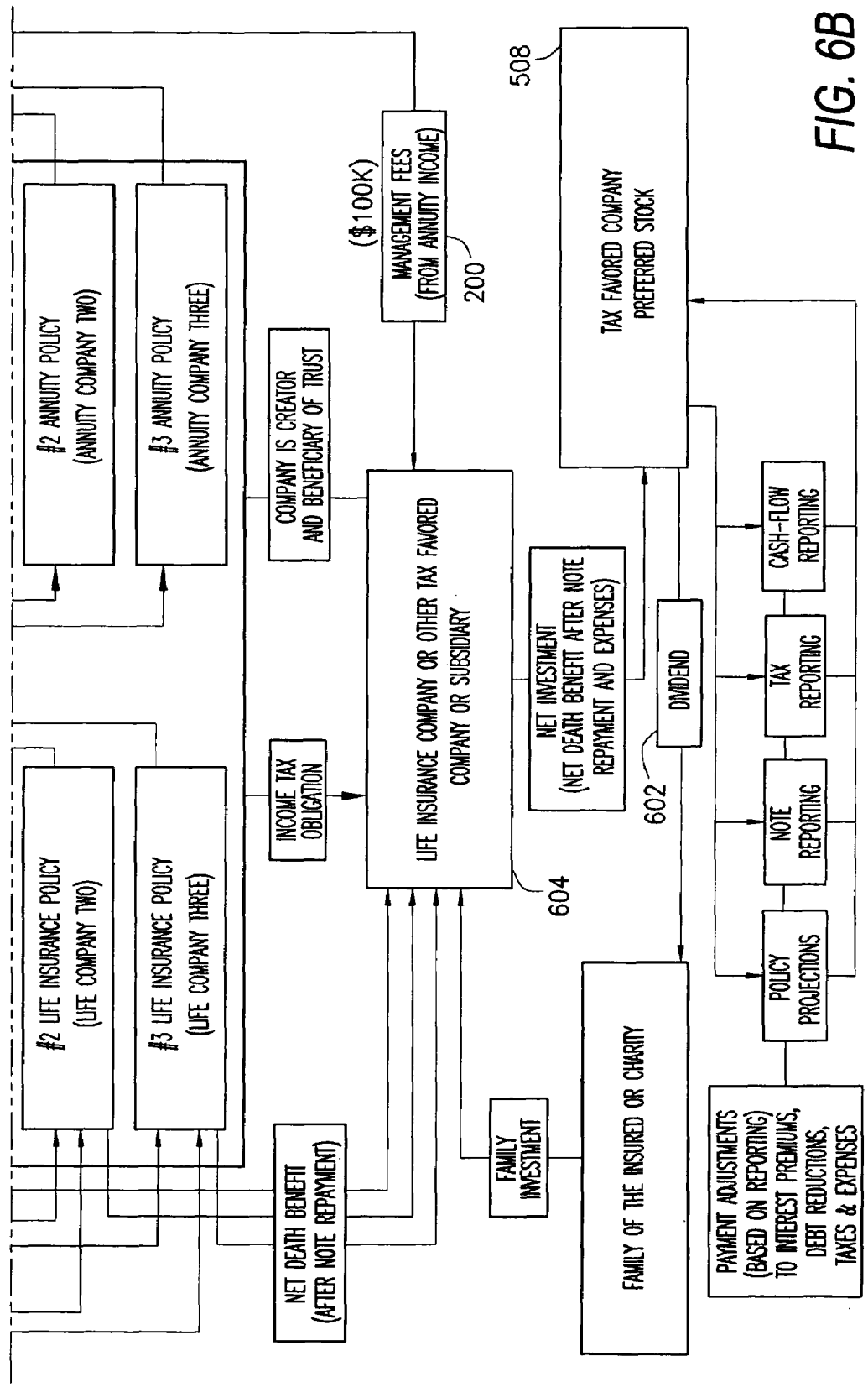
FIG. 6 shows a flowchart of the fourth embodiment of the present invention.

The fourth embodiment differs from the third in that the annuity is purchased by a subsidiary 604 of the tax favored business entity so that the tax obligation is passed to the tax-favored company 508, and the benefit is paid as taxable income in the form of a dividend 602, as shown in FIG. 6. Because of this, the fourth embodiment is more conducive to charities than the third embodiment. This is because where a charity is involved, a dividend 602 would be an acceptable distribution method since in most cases this would not be taxed to the charity. Conversely, the partnership 504 income (K-1) of the third embodiment would be a more difficult distribution method for a charity.

Figure 7:
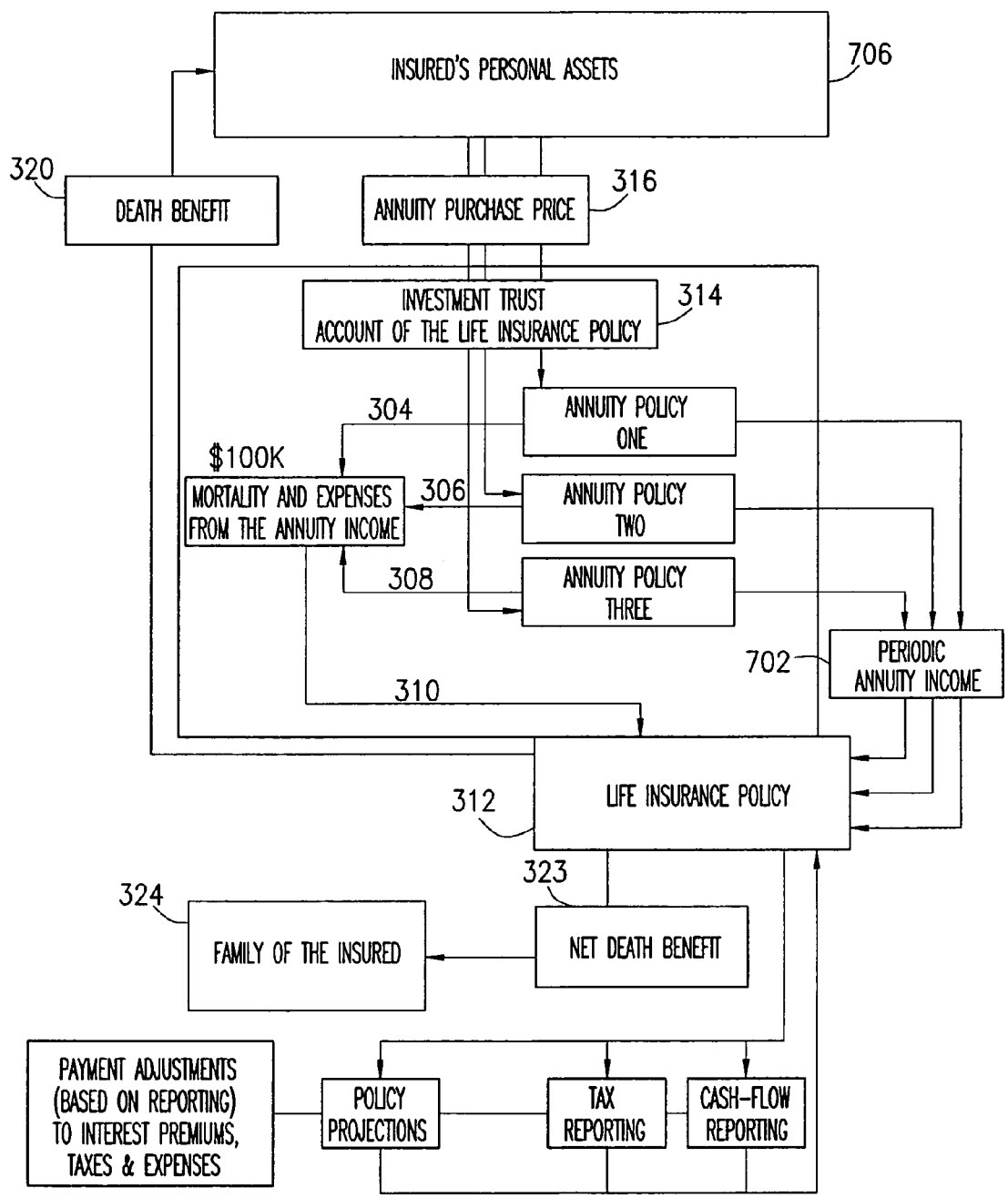
FIG. 7 shows a modification of the first embodiment of the present invention.

A further modification exists for all four embodiments discussed above. That modification is that borrowed money is not used, but that the annuity is paid for from the assets of the settlor or customer. FIG. 7 shows the first embodiment of FIG. 3 modified to substitute personal assets 706 for references to the lender and note. Since non-borrowed assets are used to purchase the annuities, it is then also necessary to make substantial alterations to investment trust 314. This is partially because repayment obligations and their tax consequences no longer need to be considered. Instead, periodic annuity income 702 is redirected to life insurance policy 312. The second, third, and fourth embodiments can be similarly modified to use non-borrowed funds, although no additional diagrams are shown. In such a case, the four boxes labeled "Policy Projections", "Note Reporting", "Tax Reporting", and "Cash-flow Reporting" would be removed and replaced with three boxes, labeled "Policy Projections", "Tax Reporting", and "Cash-flow Reporting".

Charities

Any of either the first, second, third, fourth, or non-lender embodiments described above can be combined with an entity known as a Charitable Endowment Life Insurance Policies (CELIP), although the third embodiment is subject to certain limitations when doing so. As stated earlier, there are three primary concerns for charities in using the financial structure of the present invention. First, tax-exempt organizations must be careful not to engage in any activities that may endanger their tax-exempt status. Second, tax-exempt organizations will not generally use their existing resources to fund directly or to be uses as a guarantee for the funding of insurance products. Many insurance products do not meet their criteria for investing. Third, computerized tools necessary to administer the very complex (both legally and financially) strategies are generally not available.

All of the above problems are solved by the present invention's accommodation of charities using CELIP instruments. CELIPs can enhance payout of life insurance policy, reduce risk of a life insurance policy, benefit charity or other exempt organizations, and avoid adverse income tax consequences associated with other designs. The primary owner and or beneficiaries could be a charitable or otherwise tax exempt organization such as a University. Another market could be a family office.

The CELIP will include within its investment choices the option to borrow money and the right to purchase an immediate annuity. These choices will be viewed directly as policy investments or payments from the annuity to the policy, and will be used (either directly or through a money market account) to pay expenses and mortality costs of the life insurance policy.

Figure 8:
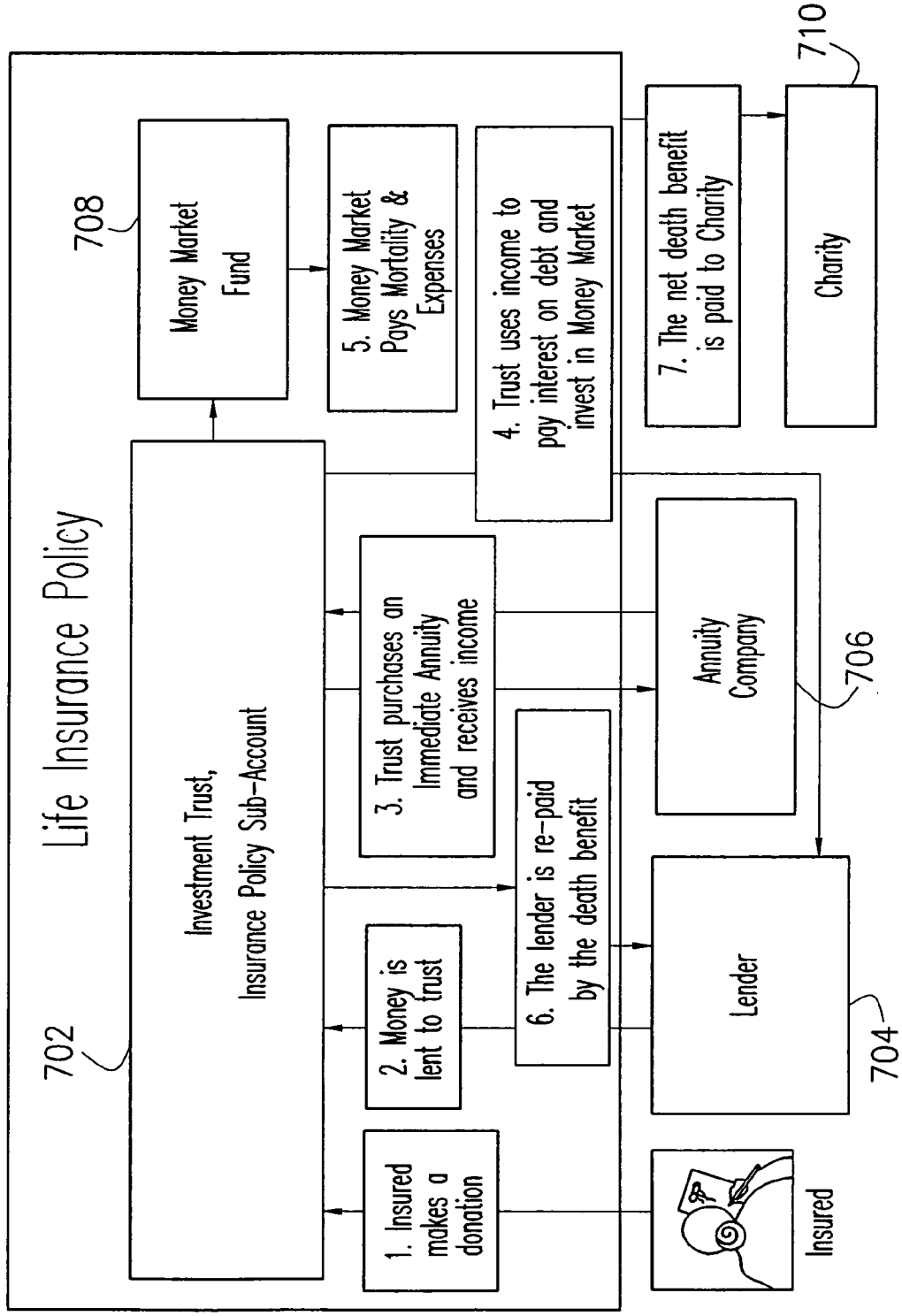
FIG. 8 shows the Charitable Endowment Life Insurance Policies (CELIP) as used within the present invention.

FIG. 8 shows the sequence by which the CELIP accomplishes these tasks. The insured can make a donation to the investment trust 702, and/or money can be lent to the trust 702 by lender 704. This money is used by the trust 702 to purchase an immediate annuity from annuity company 706 and commence receiving income therefrom. The trust income pays interest on the debt, and also is invested in a money market account 708. Upon death of the insured, that money market account 708 is used to pay funeral expenses, and the lender 704 (if any) is paid by the death benefit. The net death benefit remaining after the lender 704 has been repaid is then paid to the designated charity 710.

As shown in FIG. 8 step 6, the CELIP policy will be structured internally in such a way that the insurance proceeds will first be used to repay the lender 704 (if any). Only after the lender 704 has been repaid is the main insurance benefit paid to the beneficiary 710, as shown in step 7.

Computers

Because of its complexity, computers are necessary to properly implement the present invention. As stated earlier, the financial industry has stringent requirements for investment diversity, so each individual client may have as many as six annuities. A company that manages several clients must buy annuities throughout various companies within the annuity industry. Although the examples in FIGS. 1 and 2 show only two, each client may also have as many as four life insurance policies. The management company 402/509 will also get annuity payments every month to the individual policy they belong to and track all those values. In addition to that, they must check the loan (supposing a lender embodiment), whether it is a variable rate loan which will negatively or positively amortize, must determine on a regular basis what amounts should go into the policy, and must review the policies and make adjustments on a regular basis. Additionally, many of these fiduciary relationships are governed by explicit terms within the trust instrument described earlier. Thus, management company 402/509, as trustee, is legally required to manage the information with the utmost scrutiny possible.

FIGS. 3-6 show an additional complication, which is that the annuity income stream 506 does not flow directly to the trust 314, because the lender 318 wants control (first dibs) over this cash. Thus, all of the income stream 506 is assigned to the lender 318. The lender 318 acts as the pay master. If a payment went to the lender 318, but the lender didn't send it off to one of the three life insurance companies 220, a "lapse notice" could result.

The above scenario described all of the necessary conditions for one client. Thus, for one hundred clients it is absolutely unmanageable without a computer system in place. Accordingly, the management company 402/509 that runs the trust 212 has to be on top of the lender 216 and share data with them to ensure payments are going from lender 216 to insurance companies 220, as well as micromanage other key aspects of the payment system. Specifically, such a data sharing or reporting system must coordinate data between clients, a management company 402/509, and lender 318. It is estimated that the computer system of the present invention will track thousands of transactions that will be occurring on a monthly basis. These transactions will include:

Receiving of monthly income from each annuity.

On a monthly basis determining the amount to be credited from each annuity to each life insurance policy's money market, general account and/or mortality and expenses.

On a monthly basis determining the amount to be credited to the lender for each loan. These notes will mostly be floating rate notes.

On a monthly basis determining the amount positive or negative loan amortization to be added or subtracted from each loan.

On a monthly basis performing a test to determine if the loan is in default.

At the death of the insured, determining the amounts to be paid to the lender.

The above transactions are shown as the four boxes on the bottom of FIGS. 3-6, which are labeled "Policy Projections", "Note Reporting", "Tax Reporting", and "Cash-flow Reporting". Thus, the management company 402/509 that runs the trust 212 must monitor payments originating from the lender 216, as well as micromanage the reporting system described above. If the payment/reporting system is not micromanaged properly, things could fall apart quickly, with possible legal consequences including but not limited to breach of the duty of trusteeship. Consequently, a computer system capable of sharing data including payment records is crucial to the successful operation of the present invention.

Figure 9:
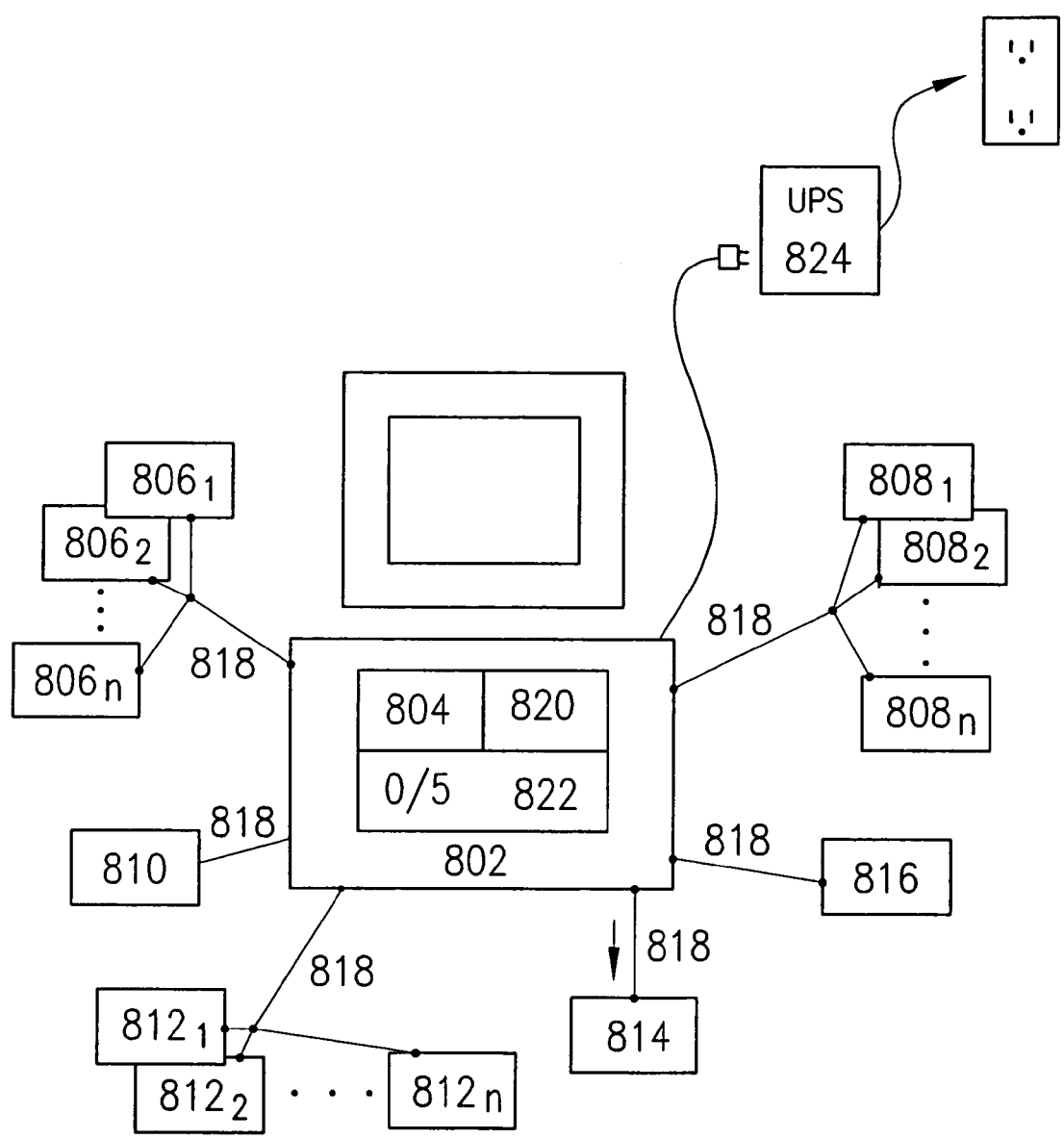
FIG. 9 shows a computerized implementation of the present invention.

As shown in FIG. 9, main computer system 802 has responsibility for several of the above duties. The computer system 802 is drawn as a stand-alone machine, although it could be a combination of several computers networked together, including servers, desktop machines, remote terminals, and any combination thereof. Proprietary software 804 includes means for separately and independently telecommunicating with each life insurance company $806_{1-n}$, annuity company(s) $808_{1-n}$, commercial lender 810, investors/bondholders $812_{1-m}$, clients 814 curious about the state of their account, and a KDI-type service entity 816. Because of the sensitive financial nature of the information contained therein, all data connections 818 must be secure. Several possible implementations exist by which to achieve this, including but not limited to leased line, WAN, ISDN, Internet sockets upon which reside secure encryption layers, or any of numerous implementations of secure TCP/IP. Note that the client's 814 connection 818 flows only in one direction, because it is a read-only connection. Such a connection can be implemented using secure URL which can be viewed but not modified using any of a variety of Internet browsers. If the client wishes to make alterations in her account, she cannot do so using connection 818 but must instead contact an employee of the service entity 816.

Main computer system 802 preferably has a database application layer 820 which could include but is not limited to Microsoft Access communicating closely with proprietary software application 804. These products run on top of a Operating System (OS) 822. It is anticipated that any form of operating system can be used, including a preferably multi-threaded OS. Additionally, because of the time-sensitive nature of the information and alerts contained therein, computer system 802 also preferably has a Universal Power Supply (UPS) 824 backup in case of power failure. This is useful for two reasons. The first is that computer system 802 must remain on-line at all times in order that no payments or alerts are missed, thereby reducing the chance of any "lapse notice" being issued. Also, the integrity of the date/time function within computer system 802 must be assured. If the computer system 802 had an incorrect date/time, many false payments and false alerts could result.

Figure 10:
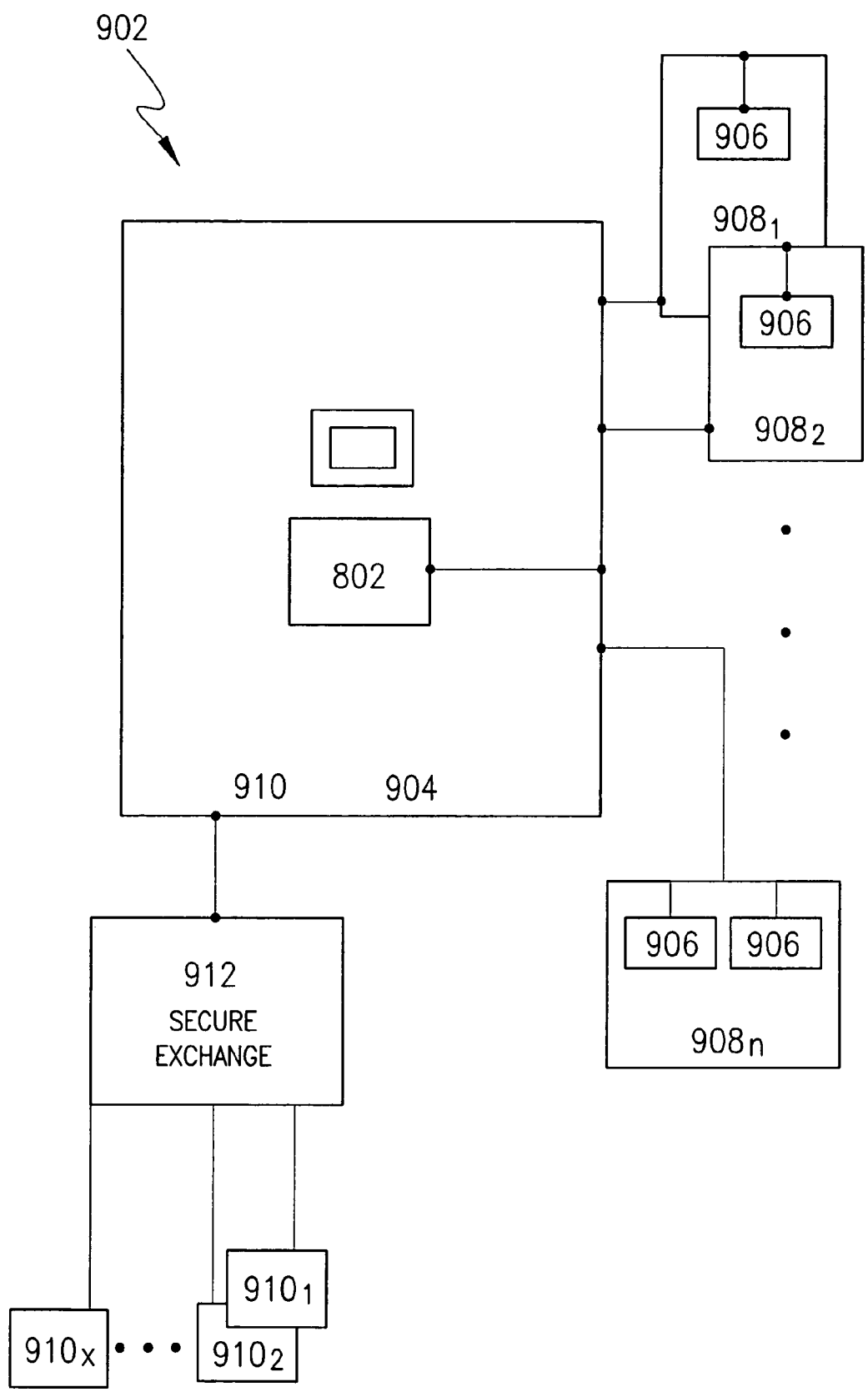
FIG. 10 shows the implementation of FIG. 9 integrated within a service entity.

FIG. 10 is an overview of how main computer system 802 is integrated within a larger computer system 902 run by a service entity 816 responsible for implementing the present invention. Main computer system 802 is located in headquarters 904, while remote terminals $906_{1-n}$ are located in Field Offices $908_{1-m}$. Secure logons $910_{1-x}$ accessible only by employees of service entity 816 are located anywhere an Internet connection can be established, including airports and hotel rooms. Data integrity is maintained by channeling all employee secure remote Internet logons 910 through a Secure Exchange Server 912.

Fifth Embodiment

A fifth embodiment involves providing a means of financing life insurance through a premium financing unilateral arrangement. There has been a recent explosion in lending for life insurance. Often these loans qualify individuals without While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of the United States is:

1. A method of managing combined life insurance and financial instruments for a group of insured persons using a computer system including a database and communications software to permit the computer system to receive data from and to transmit data to a plurality of external entities, the method comprising the steps of:

(a) having arranged for an influx of capital from a source of capital, wherein said source has imposed certain repayment obligations concerning said capital, and having input data concerning the amount of said capital and said repayment obligations into said database;

(b) having acquired through a first entity at least one financial instrument providing a cash flow for each insured person using a portion of said capital, wherein the first entity is owned by a second entity that is of a tax favored nature, and wherein said cash flow of each financial instrument is allocated to the second entity so that it receives tax favored treatment, and having input into said database information concerning said cash flow of said financial instrument;

(c) having acquired at least one life insurance policy for each insured person, the at least one life insurance policy being acquired by a set of third entities, each third entity having an owner wherein the owner of each third entity has an insurable interest in one of the group of insured persons, and each third entity has acquired at least one life insurance policy on the life of the insured person in which its owner has the insurable interest, and wherein each life insurance policy imposes on its respective third entity a premium payment obligation to pay a premium on a regular basis, and wherein each third entity is organized in a manner to shield the insured person on which it has acquired life insurance from liability from the commercial lender and from any taxes on the financial instrument acquired for that insured person; and wherein a portion of said capital has been used to pay the initial premium for each life insurance policy, and having input into said database information concerning said premium payment obligations for each life insurance policy;

(d) receiving and tracking information, via the computer system, concerning said cash flow from each financial instrument, and maintaining information in said database pertaining to said cash flows;

(e) monitoring and executing, via the computer system, the distribution of said cash flow from each said financial instrument to pay the premiums for the respective life insurance policy associated with each said financial instrument and to repay said source of capital, wherein the amount and timing of said distributions of said cash flows are dependent upon said premium payment obligation information for each such life insurance policy stored in said database and dependent upon the repayment obligations imposed by said source of capital stored in said database; and (f) updating the database of the computer system upon each such distribution of said cash flows to reflect each such payment of a premium for said life insurance policies and each such payment of the repayment obligations for said capital.

2. The method of claim 1, wherein the financial instrument is an annuity.

3. The method of claim 1, wherein the second entity comprises an insurance company.

4. The method of claim 1, wherein said source of capital comprises financing from a commercial lender.

5. A method of managing combined life insurance and financial instruments for a group of insured persons using a computer system including a database and communications software to permit the computer system to receive data from and to transmit data to various external entities, the method comprising the steps of:

(a) acquiring or having acquired through a first entity at least one financial instrument for providing an income stream for an insured person, wherein the first entity is owned by a second tax favored entity and having input into said database information concerning the income stream and repayment obligations of said at least one financial instrument;

(b) allocating the income stream to the second entity so that the income stream receives tax favored treatment;

(c) acquiring or having acquired at least one life insurance policy on the life of the insured person, the at least one life insurance policy being acquired by at least one third entity, whereby each life insurance policy has associated therewith a premium payment obligation to pay a premium on a regular basis, and the third entity shields the insured person from taxes on the income stream;

(d) inputting into said database information concerning said premium payment obligations for each life insurance policy and using said database to track and maintain the premium payment obligations of each third entity for each life insurance policy;

(e) monitoring and administering, via the computer system, the income stream and each life insurance policy;

(f) distributing, via the computer system, at least a portion of the income stream to pay a premium for each life insurance policy; and (g) updating the database of the computer system upon each such distribution of the portion of the income stream to reflect each such payment of a premium for the life insurance policy.

6. The method of claim 5, wherein the financial instrument is an annuity.

7. The method of claim 5, wherein the second entity comprises an insurance company.

8. A method of managing combined life insurance and annuities for a group of insured persons using a computer system including a database and communications software to permit the computer system to receive data from and to transmit data to various external entities, the method comprising the steps of:

(a) having arranged financing and having incurred certain repayment obligations concerning said financing, and having input data concerning the amount of said financing and said repayment obligations into said database;

(b) having acquired through a first entity at least one annuity for each insured person using a portion of said financing, wherein the first entity is owned by a second entity that has tax-favored status, and wherein each annuity provides an income stream that is allocated to the second entity so that it receives tax favored treatment and having input into said database information concerning the income stream of each annuity and the allocation thereof to the second entity;

(c) having acquired at least one life insurance policy for each insured person, the at least one life insurance policy being acquired by a set of third entities, wherein the owner of each third entity has an insurable interest in one of the group of insured persons, and each third entity has acquired at least one life insurance policy on the life of the insured person in which its owner has the insurable interest, whereby each said life insurance policy has associated therewith premium payment obligation to pay a premium on a regular basis, and wherein each third entity is capable of shielding the insured person on which it has acquired life insurance from liability for the financing and from taxes for that insured person; and wherein a portion of the financing has been used to pay at least one premium for said at least one life insurance policy and having input into said database information concerning said premium payment obligations for said at least one life insurance policy;

(d) receiving and tracking, via the computer system, information concerning, the income streams relating to the annuities, the financing, and the at least one life insurance policy and maintaining information pertaining to the income streams in said database;

(e) distributing, via the computer system, the income streams from the annuities to pay the premiums for at least one life insurance policy and to pay the interest and principal on said financing based on the income stream information; and (f) updating the database of the computer system upon each such distribution of the income streams to reflect each such payment of a premium for said life insurance policies and each such payment of the repayment obligations for said financing.

9. A method of managing a group of insured persons using a computer system including a database and communications software to permit the computer system to receive data from and to transmit data to various external entities, the method comprising the steps of:

(a) acquiring or having acquired through a first entity at least one annuity for each insured person, wherein the first entity is owned by a second tax favored entity and wherein each annuity generates income;

(b) allocating said income from each annuity to the second entity so that said income receives tax favored treatment and tracking said allocation of said income using said database;

(c) acquiring or having acquired at least one life insurance policy, the at least one life insurance policy being acquired by at least one third entity, wherein the at least one third entity acquires or has acquired at least one life insurance policy on the life of one of the group of insured persons, and the at least one third entity is organized in a manner to shield the insured person on which it has acquired life insurance from taxes on the said income from the annuity acquired for that insured person and wherein each life insurance policy has associated therewith a premium payment obligation to pay a premium on a regular basis;

(d) receiving and tracking, via the computer system, information concerning said income relating to the annuities and the life insurance policies and maintaining information pertaining to said income in said database;

(e) tracking and maintaining, via the computer system, the premium payment obligations of each third entity for each life insurance policy; and (f) monitoring and executing via the computer system, the distribution of at least a portion of said income to pay the annual premiums for the life insurance policies.

10. A method of managing combined life insurance and financial instruments for a group of insured persons using a computer system including a database and communications software to permit the computer system to receive data from and to transmit data to various external entities, the method comprising the steps of:

having arranged for an influx of capital from a source of capital, wherein said source has imposed certain repayment obligations concerning said capital, and having input data concerning the amount of said capital and said repayment obligations into said database;

having acquired at least one financial instrument providing an income stream for each insured person using a portion of said capital, the ownership of the financial instruments being structured in a manner such that the income stream of each said financial instrument receives tax favored treatment;

having input into said database information concerning the income stream of each said financial instrument;

having acquired at least one life insurance policy for each insured person, wherein a portion of said capital has been used to pay the initial premium for each life insurance policy, and wherein the ownership of each life insurance policy is organized in a manner to shield the insured persons from liability with respect to said source of capital and from any taxes on said financial instrument acquired for that insured person, and whereby each life insurance policy has associated therewith a premium payment obligation to pay a premium on a regular basis;

receiving and tracking, via the computer system, information concerning the income streams relating to said financial instruments and maintaining information pertaining to the income streams in said database;

tracking and maintaining, via the computer system, the requirements concerning said capital from said source of capital;

tracking and maintaining, via the computer system, the premium payment obligations of each third entity for each life insurance policy; and monitoring and executing, via the computer system, the distribution of the income stream of each financial instrument to pay the annual premiums for the life insurance policies and to repay said source of capital.

11. The method of claim 10, wherein said source of capital comprises financing from a commercial lender.

12. The method of claim 10, wherein the financial instrument comprises an annuity.

\* \* \* \* \*

UNITED STATES PATENT AND TRADEMARK OFFICE
CERTIFICATE OF CORRECTION

PATENT NO.       : 7,644,022 B2                                                Page 1 of 1
APPLICATION NO. : 11/154572
DATED            : January 5, 2010
INVENTOR(S)      : Bart Kavanaugh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1057 days.

Signed and Sealed this

Sixteenth Day of November, 2010

David J. Kappos
*Director of the United States Patent and Trademark Office*